(12) United States Patent
Ogura

(10) Patent No.: US 9,337,452 B2
(45) Date of Patent: May 10, 2016

(54) BATTERY PACKS AND SYSTEMS INCLUDING BATTERY PACKS AND ELECTRIC APPARATUS

(71) Applicant: MAKITA CORPORATION, Anjo-shi, Aichi (JP)

(72) Inventor: Hironori Ogura, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 480 days.

(21) Appl. No.: 13/889,605

(22) Filed: May 8, 2013

(65) Prior Publication Data

US 2013/0308253 A1 Nov. 21, 2013

(30) Foreign Application Priority Data

May 18, 2012 (JP) ................................. 2012-114189

(51) Int. Cl.
*H01M 2/10* (2006.01)
(52) U.S. Cl.
CPC ........ *H01M 2/1022* (2013.01); *H01M 2220/30* (2013.01)
(58) Field of Classification Search
CPC .......................... H01M 2/1022; H01M 2220/30
See application file for complete search history.

(56) References Cited

U.S. PATENT DOCUMENTS

| | | | | |
|---|---|---|---|---|
| 6,057,608 A | * | 5/2000 | Bailey, Jr. ................. | B25F 5/02 307/403 |
| 2003/0039880 A1 | * | 2/2003 | Turner ................ | H01M 2/1022 429/97 |
| 2004/0072064 A1 | * | 4/2004 | Turner ................ | H01M 2/1022 429/97 |
| 2010/0156350 A1 | * | 6/2010 | Murayama .......... | H01M 2/1022 320/128 |
| 2012/0045667 A1 | * | 2/2012 | Yoneda ............... | H01M 2/1055 429/7 |
| 2013/0154565 A1 | * | 6/2013 | Sakai .................. | H01M 2/1022 320/113 |
| 2013/0244504 A1 | * | 9/2013 | Ogura ................... | H01R 13/11 439/759 |
| 2013/0280573 A1 | * | 10/2013 | Taga ..................... | H01M 2/105 429/100 |

FOREIGN PATENT DOCUMENTS

GB    2 386 746 A    9/2003
JP    A-2001-143678    5/2001

OTHER PUBLICATIONS

Extended Search Report issued in European Patent Application No. 13 16 7826.0 Aug. 21, 2013.

* cited by examiner

*Primary Examiner* — Stewart Fraser
(74) *Attorney, Agent, or Firm* — Oliff PLC

(57) ABSTRACT

A battery pack may have a main connection section and an auxiliary connection section. The main connection section may be connectable with a plurality of electric apparatuses including a specific kind of electric apparatus and a non-specific kind of electric apparatus. The auxiliary connection section may be connectable with only the specific kind of electric apparatus.

13 Claims, 9 Drawing Sheets

BATTERY PACKS AND SYSTEMS INCLUDING BATTERY PACKS AND ELECTRIC APPARATUS

This application claims priority to Japanese patent application serial number 2012-114189, the contents of which are incorporated herein by reference.

BACKGROUND OF THE INVENTION

1. Field of the Invention

Embodiments of the present invention relate to battery packs that may be connected to battery mount portions of electric apparatus. The embodiments also relate to systems including battery packs and electric apparatuses to which the battery packs are connected.

2. Description of the Related Art

JP-A-2001-143678 discloses a battery pack 100 shown in FIGS. 13 and 14. The battery pack 100 is designed for use as a power source of an electric tool. As shown in FIG. 13, the battery pack 100 includes left and right slide rails 103 disposed at the upper surface of a housing 102 for connection with a battery mount portion 105 (see FIG. 14) of the electric tool. The slide rails 103 extend in a forward and rearward direction with respect to the battery pack 100. As shown in FIG. 14, each of the slide rails 103 includes a rail body 103m and a laterally projecting linear projection 103y protruding outward in a widthwise direction (leftward and rightward) by a given distance from the upper end of the rail body 103m. In this way, each of the slide rails 103 has a substantially inverted L-shape cross-section.

As shown in FIG. 14, the battery mount portion 105 of the electric tool has a pair of vertical walls 106 at opposite ends in the widthwise direction. A rectangular groove 106m is formed in the inner wall of each of the vertical walls 106 and extends in the forward and rearward direction for fitting with the corresponding slide rail 103 of the battery pack 100. Therefore, the battery pack 100 can be connected to the electric tool by initially fitting the laterally projecting linear projections 103y of the slide rails 103 of the battery pack 100 into the rectangular grooves 106m of the battery mount portion 105 of the electric tool. Afterwards, it can be accomplished by moving the electric tool and the battery pack 100 to slide relative to each other in the forward and rearward direction.

A plurality of different types of electric tools may have standardized battery mount portions each configured to be similar to the battery mount portion 105. Also a plurality of different types of battery packs may have standardized slide rails each configured to be similar to the slide rails 103. In this way, a specific battery pack (e.g., the battery pack 100) can be shared with a plurality of electric tools.

However, in the case that a plurality of different types of battery packs have standardized slide rails 103, even a small battery pack is necessary to have the slide rails 103 that are the same as those of a large battery pack.

The standardized slide rails 103 may be too large for a small battery pack, leading to difficulties in reducing the size of the battery packs.

Therefore, there has been a need in the art for enabling a small battery pack having a standardized connection section with a reduced size.

SUMMARY OF THE INVENTION

In one aspect according to the present teachings, a battery pack may have a main connection section and an auxiliary connection section. The main connection section may be connectable with a plurality of different kinds of electric apparatus including a specific kind of electric apparatus and a non-specific kind of electric apparatus. The auxiliary connection section may be connectable with only the specific kind of electric apparatus.

DETAILED DESCRIPTION OF THE INVENTION

Figure 1:
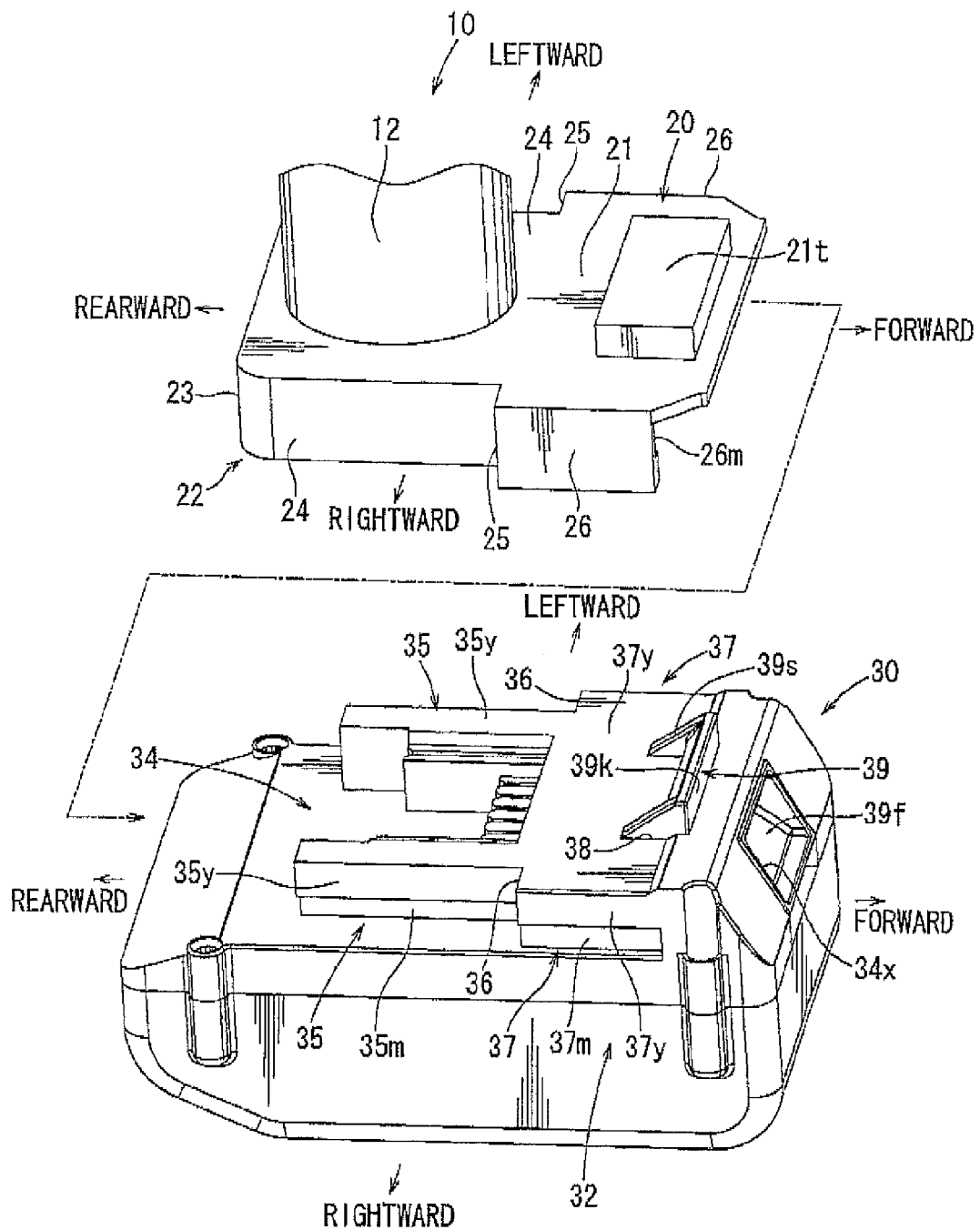
FIG. 1 is a perspective view of a large battery pack and a battery mount portion of a large electric tool, to which the large battery pack is connected, according to a first embodiment.
Figure 2:
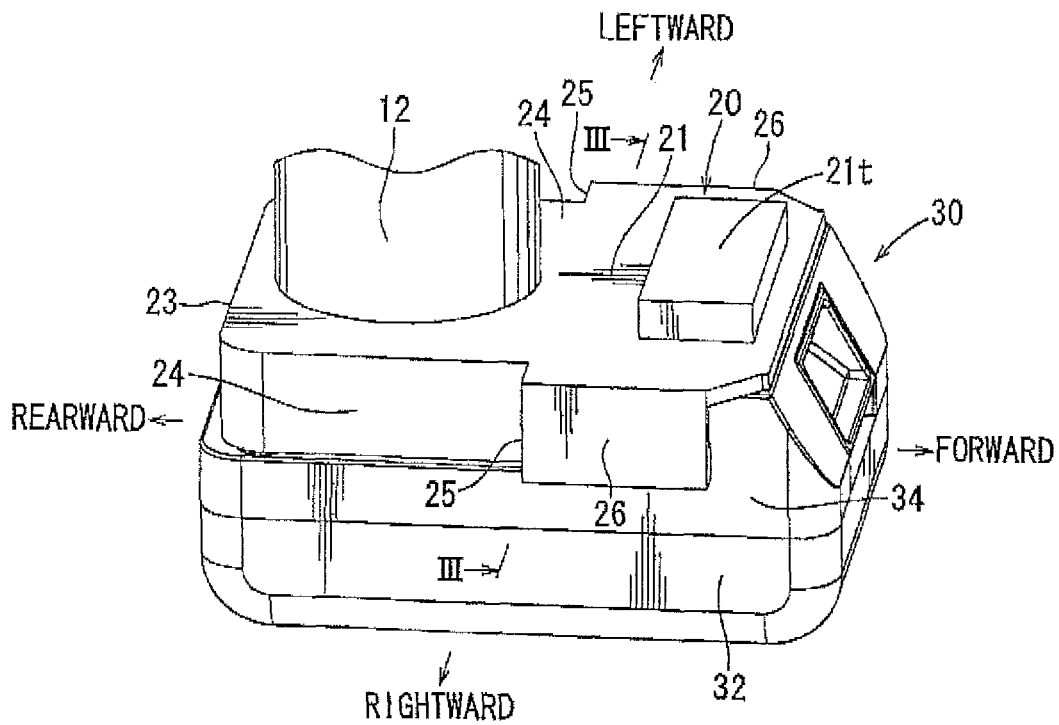
FIG. 2 is a perspective view showing the state where the large battery pack and the battery mount portion of the large electric tool have been connected to each other.

Each of the additional features and teachings disclosed above and below may be utilized separately or in conjunction with other features and teachings to provide improved battery packs and electric apparatus systems. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, a battery pack may be connectable with battery mount portions of a plurality of different kinds of electric apparatuses. The battery pack may include a main connection section and an auxiliary connection section. The main connection section may be connectable with main connection complimentary sections of the battery mount portions of the different kinds of electric apparatuses as the main connection section is slid relative thereto. The auxiliary connection section may be connectable with an auxiliary connection complimentary section provided only on the battery mount portion of a specific kind of electric apparatus of the different kinds of electric apparatuses. The main connection section and the auxiliary connection section are configured such that the weight of the battery pack may be supported at the main connection section and the auxiliary connection section when the battery pack is connected to the battery mount portion of the specific kind of electric apparatus.

With this arrangement, in the case where the main connection section used for connection with the battery mount portions of the different kinds of electric apparatuses is designed to have a small size, the weight of the battery pack can be securely supported with the aid of the auxiliary connection section even using a large battery pack having a weight that is relatively large.

By designing the main connection section to be small in size in this way, it is possible to reduce the size of the battery pack. Incorporating the main connection section as a standardized connection section for different battery packs for connection with different kinds of electric apparatuses can be useful. One such embodiment may include a battery pack having only the main connection section. In such an embodiment, a battery pack having only the main connection section can be configured to have a small size.

The main connection section and the auxiliary connection section may be disposed at positions spaced apart from each other. With this arrangement, the weight of the battery pack can be efficiently supported at two different positions.

The auxiliary connection section may be connectable with the auxiliary connection complimentary section as the auxiliary connection section is slid relative to the auxiliary connection complimentary section.

The main connection section may be connectable with the main connection complimentary section of the battery mount portion of the specific kind of electric apparatus as the main connection section is slid relative to the main connection complimentary section in a first sliding direction. On the other hand, the auxiliary connection section may be connectable with the auxiliary connection complimentary section of the battery mount portion of the specific kind of electric apparatus as the auxiliary connection section is slid relative to the auxiliary connection complimentary section in a second sliding direction that is the same as the first direction.

The auxiliary connection complimentary section may include a projection. The auxiliary connection section may include an engaging portion engageable with the projection.

The engaging portion may be disposed at a position determined such that the engaging portion engages the projection after the main connection section is slid in a direction relative to the main connection complimentary section of the battery mount portion of the specific kind of electric apparatus.

The main connection section and the auxiliary connection section may be respectively connectable with the main connection complimentary section and the auxiliary connection complimentary section of the battery mount portion of the specific kind of electric apparatus. However, only the main connection section may be connectable with the main connection complimentary section of the battery mount portion of the other kinds of electric apparatuses other than the specific kind of electric apparatus.

In another embodiment, a system may include different kinds of electric apparatuses each having a battery mount portion, and different kinds of battery packs connectable with the battery mount portions. The different kinds of electric apparatuses may include a specific. End of electric apparatus and a non-specific kind of electric apparatus. The different kinds of battery packs may include a specific kind of battery pack having a main connection section and an auxiliary connection section, and non-specific kind of battery pack having a main connection section and no auxiliary connection section. The battery mount portion of the specific kind of electric apparatus may include a main connection complimentary section and an auxiliary connection complimentary section. The main connection complimentary section of the battery mount portion of the specific kind of electric apparatus may be connectable with the different kinds of battery packs as the different kinds of battery packs are slid in a sliding direction relative to the main connection complimentary section. The auxiliary connection complimentary section of the battery mount portion of the specific kind of electric apparatus may be connectable with the auxiliary connection section of the specific kind of battery pack. The battery mount portion of the non-specific kind of electric apparatus may include a main connection complimentary section and no auxiliary connection complimentary section. The main connection complimentary section of the battery mount portion of the non-specific kind of electric apparatus may be connectable with the different kinds of battery packs as the different kinds of battery packs are slid in a sliding direction relative to the main connection complimentary section. The main connection section and the auxiliary connection section of the specific kind of battery pack may be configured such that the weight of the specific kind of battery pack can be supported at the main connection section and the auxiliary connection section when the specific kind of battery pack is connected to the battery mount portion of the specific kind of electric apparatus.

In a further embodiment, a system may include a specific kind of electric apparatus having a battery mount portion, and different kinds of battery packs connectable with the battery mount portion. The different kinds of battery packs may include a specific kind of battery pack having a main connection section and an auxiliary connection section, and non-specific kind of battery pack having a main connection section and no auxiliary connection section. The battery mount portion of the specific kind of electric apparatus may include a main connection complimentary section and an auxiliary connection complimentary section. The main connection complimentary section of the battery mount portion of the specific kind of electric apparatus may be connectable with different kinds of battery packs as the different kinds of battery packs are slid in a sliding direction relative to the main connection complimentary section. The auxiliary connection complimentary section of the battery mount portion of the specific kind of electric apparatus may be connectable with the auxiliary connection section of the specific kind of battery pack. The main connection section and the auxiliary connection section of the specific kind of battery pack may be configured such that the weight of the specific kind of battery pack can be supported at the main connection section and the auxiliary connection section when the specific kind of battery pack is connected to the battery mount portion of the specific kind of electric apparatus. The main connection section of the non-specific kind of battery pack may be configured such that the weight of the non-specific kind of battery pack can be supported only at the main connection section when the non-specific kind of battery pack is connected to the battery mount portion of the specific kind of electric apparatus.

An embodiment will now be described with reference to FIGS. 1 to 9. A battery pack 30 can be used as a power source for driving an electric tool 10 (only a part is shown in the drawings). To this end, the battery pack 30 can be removably connected to a battery mount portion 20 of the electric tool 10. In the following description, forward, rearward, leftward, rightward, upward and downward directions are determined to correspond to those for the battery pack 30 and the electric tool 10.

<Battery Mount Portion of Power Tool>

The battery mount portion 20 of the electric tool 10 will be first described before describing the battery pack 30. The electric tool 10 may be a large electric tool having a grip portion 12 that can be grasped by a user. The grip portion 12 may have a lower end portion where the battery mount portion 20 is disposed for connection with the battery pack 30. In the following description, the electric tool 10 will be also referred to as a large electric tool 10.

As shown in FIG. 1, the battery mount portion 20 may have a shape like a rectangular lid extending both in a widthwise direction (left and right direction) and a forward direction from the lower end portion of the grip portion 12. The battery mount portion 20 may have a rectangular top plate 21 and a fence-like vertical wall 22. The vertical wall 22 may extend downward from the left and right edges and the rear edge of the top plate 21. More specifically, the vertical wall 22 may have a substantially U-shape with its front side opened as seen in a plan view. The vertical wall 22 may include a rear end wall portion 23, left and right rear-side lateral wall portions 24 and left and right front-side lateral wall portions 26. Stepped portions 25 may be formed at boundary positions between the rear-side lateral wall portions 24 and the front-side lateral wall portions 26, so that the distance between the front-side lateral wall portions 26 may be larger than the distance between the rear-side lateral wall portions 24 by a distance given by the stepped portions 25.

In this way, the left and right front-side lateral wall portions 26 are positioned on the outer side with respect to the widthwise direction of the left and right rear-side lateral wall portions 24. The length in the forward and rearward direction of the rear-side lateral wall portions 24 may be longer than the length in the forward and rearward direction of the front-side lateral wall portions 26.

Figure 4:
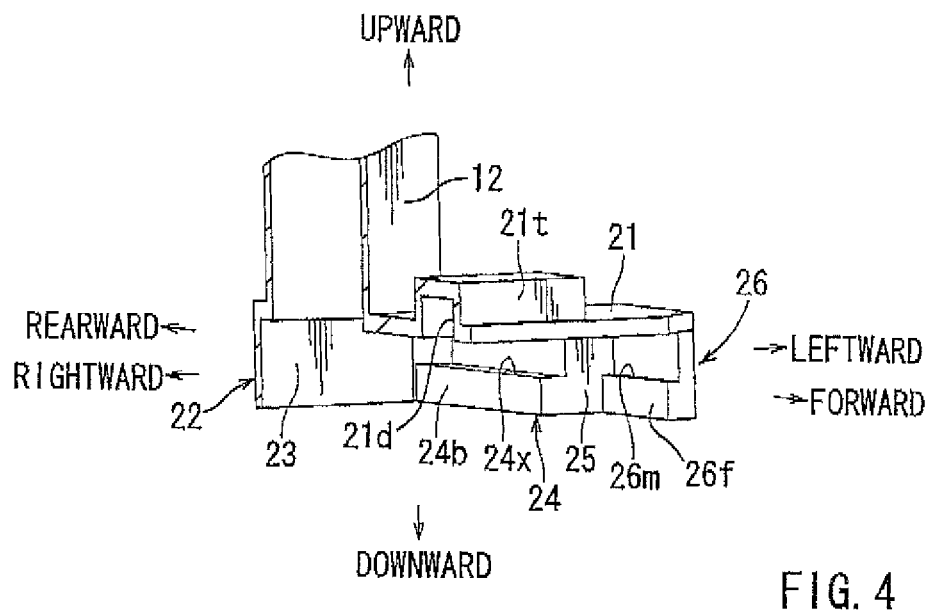
FIG. 4 is a perspective view showing a cross-section a central portion of the battery mount portion of the large electric tool.

The front-side lateral wall portions 26 as well as the rear-side lateral wall portions 24 may be symmetrical with respect to their right and left sides. As shown in FIG. 4, a front-side linear projection 26f may be formed on the lower end portion of the inner surface of each of the front-side lateral wall portions 26 to protrude inward therefrom by a given distance. A front-side rectangular groove 26m may be cleaned between the front-side linear projection 26f and the top plate 21. Similarly, a rear-side linear projection 24b may be formed on the lower end portion of the inner surface of each of the rear-side lateral wall portion 24 to protrude inward therefrom by a given distance. A rear-side rectangular groove 24x may be defined between the rear-side linear projection 24b and the top plate 21. The stepped portion 25 may separate the rear-side rectangular groove 24x and the front-side rectangular groove 26m positioned on the sane side (right side or left side), from each other (see FIG. 4).

Figure 5:
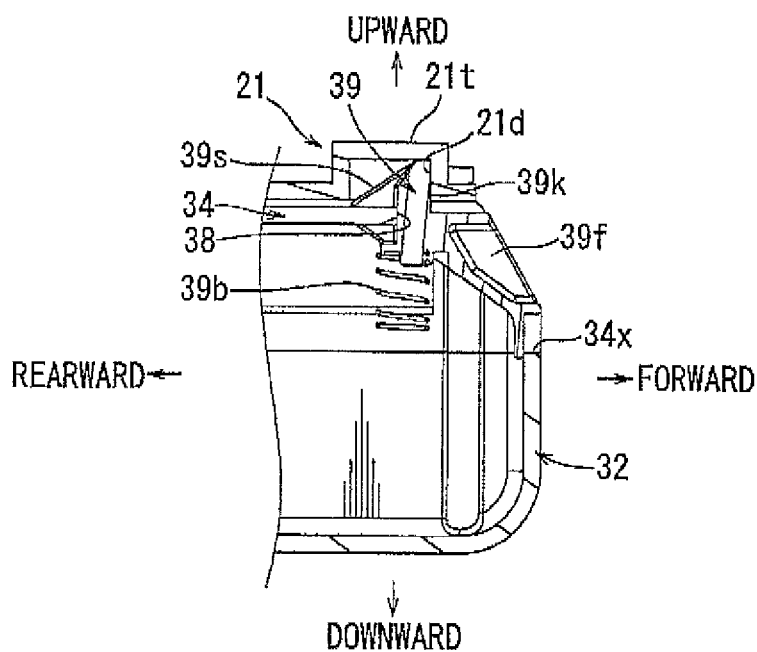
FIG. 5 is a vertical sectional view showing the operation of a hook of the large battery pack.

As shown in FIGS. 4 and 5, a rectangular projection 21t having a hat-like cross-sectional configuration may be formed at the front portion of the top plate 21. A hook-receiving stepped portion 21d may be defined at the front portion of the inner surface of the rectangular projection 21t.

<Battery Pack>

The battery pack 30 may have a large storage capacity for supplying an electric power to the large electric tool 10. In the following description, the battery pack 30 will be also referred to as a large battery pack 30.

As shown in FIG. 1, the large battery pack 30 may include a housing body 32 and a lid 34. The housing body 32 may have an upper opening and may be configured to receive a plurality of battery cells (not shown). The lid 34 may be configured to close the upper opening of the housing body 32.

A pair of rear-side slide rails 35 may be formed on the left side and the right side of the central portion (with respect to the forward and rearward directions) of the lid 34 and may extend in the forward and rearward directions. A pair of front-side slide rails 35 may be formed on the left side and the right side of the front portion of the lid 34 and may extend in the forward and rearward directions. Stepped portions 36 may be formed at the boundary positions between the front-side slide rails 37 and the rear-side slide rails 35.

The distance between the left and right front-side slide rails 37 may be set to conform to the distance between the left and right front-side lateral wall portions 26 of the battery mount portion 20 of the large electric tool 10. Similarly, the distance between the left and right rear-side slide rails 35 may be set to conform to the distance between the left and right rear-side lateral wall portions 24 of the battery mount portion 20.

In this way, the left and right front-side slide rails 37 may be positioned outward with respect to the widthwise direction of the left and right rear-side slide rails 31. In addition, the length in the forward and rearward directions of the rear-side slide rails 35 may be longer than the length in the forward and rearward directions of the front-side slide rails 37.

Figure 3:
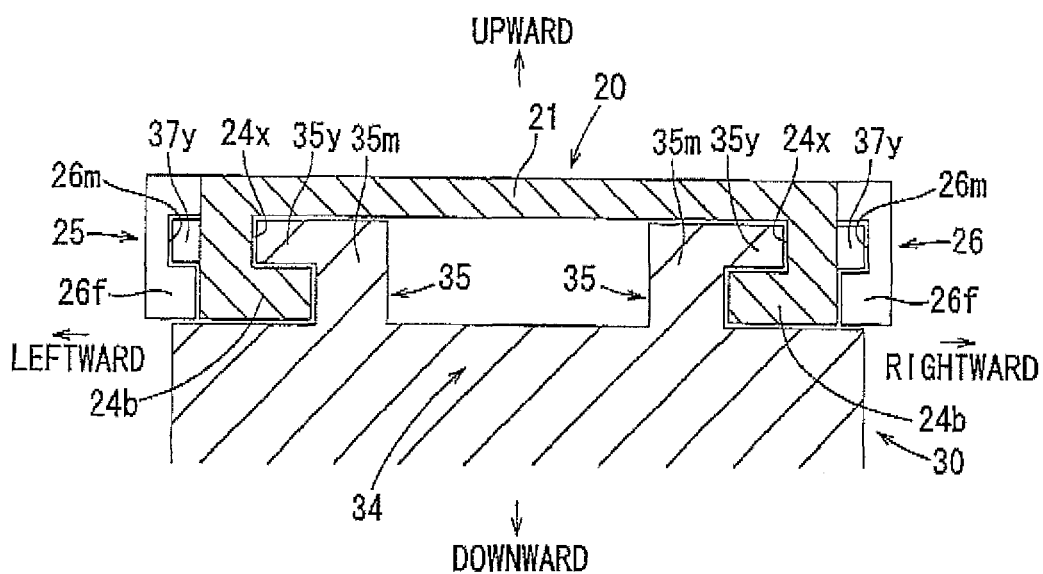
FIG. 3 is a sectional view taken along line III-III in FIG. 2.

As shown in FIGS. 1 and 3, each of the rear-side slide rails 35 may include a rail body 35m and a lateral linear projection 35y protruding outward in the widthwise direction (left and right direction) by a given distance from the upper end portion of the rail body 35m. In this way, each of the rear-side slide rails 35 may have a substantially inverted L-shaped cross section. The lateral linear projections 35y of the rear-side slide rails 35 may be fitted into the rear-side rectangular grooves 24x of the battery mount portion 20 of the large electric tool 10 so as to be slid relative thereto in the forward and rearward directions.

Similarly, as shown in FIG. 1, each of the front-side slide rails 37 may include a rail body 37m and a lateral linear projection 37y protruding outward in the widthwise direction (left and right direction) by a given distance from the upper end portion of the rail body 37m. The lateral linear projections 37y of the front-side slide rails 37 may be fitted into the front-side rectangular grooves 26m of the battery mount portion 20 of the large electric tool 10 so as to be slid relative thereto in the forward and rearward directions.

A slit-like opening 38 having a laterally facing U-shape in plan view may be formed in the lid 34 of the large battery pack 30 at a position between the left and right front-side slide rails 37. A hook 39 may protrude outward from the lid 34 through the slit-like opening 38 for preventing the large electric tool 10 from being slid rearward beyond the hook 39 (i.e., from being removed from the lid 34 as a result of the rearward sliding movement). As shown in FIG. 1, the hook 39 may include a slide lock portion 39k and a lock release button 39f formed integrally with each other. The slide lock portion 39k can protrude upward through the slit-like opening 38 of the lid 34. The lock lease button 39f may be exposed to the outside at an operation opening 34x formed in the front portion of the lid 34. The slide lock portion 39k may include a front portion having a front surface extending substantially vertically, and a rear portion that may have an inclined surface 39s for contacting a front end portion of the top plate 21 of the battery mount portion 20. A spring 39b may be disposed inside of the lid 34 in order to bias the hook 39 to move upward (see FIG. 5). The hook 39 may be normally held at an uppermost position by the biasing force of the spring 39b. The front surface of the front portion of the slide lock portion 39k may engage the hook receiving stepped portion 21d formed inside of the rectangular projection 21t of the battery mount portion 20, so that the sliding movement in the removing direction (rearward sliding movement) of the large electric tool 10 can be prevented.

As the lock release button 39 is pressed to move the hook 39 downward against the biasing force of the spring 39b, the slide lock portion 39k may be disengaged from the hook receiving stepped portion 21d of the battery mount portion 20 to enable the large electric tool 10 to slide in the removing direction (rearward direction).

<Connection between Large Battery Pack and Large Electric Tool>

In order to connect the large battery pack 30 and the large electric tool 10, the large electric tool 10 may be moved horizontally forward from the rear side of the large battery pack 30, so that the front ends of the left and right rear-side rectangular grooves 24x of the battery mount portion 20 of the large electric tool 10 are brought to be fitted with the rear ends of the left and right rear-side slide rails 35 of the large battery pack 30. Then, the battery mount portion 20 of the large electric tool 10 may be pushed forward relative to the large battery pack 30, so that the left and right rear-side slide rails 35 and the left and right rear-side rectangular grooves 24x may slide relative to each other in the forward and rearward directions while they are fitted with each other. In the course of the forward sliding movement of the battery mount portion 20 of the large electric tool 10 relative to the large battery pack 30, the front ends of the left and right front-side rectangular grooves 26m of the battery mount portion 20 may be fitted with the rear ends of the left and right front-side slide rails 37 of the large battery pack 30. As the battery mount portion 20 of the large electric tool 10 is pushed further forward relative to the large battery pack 30, the left and right front-side slide rails 37 and the left and right front-side rectangular grooves 26m as well as the left and right rear-side slide rails 35 and the left and right rear-side rectangular grooves 24x may slide relative to each other in the forward and rearward direction while they are fitted with each other.

In the course of the forward sliding movement of the battery mount portion 20 of the large electric tool 10 relative to the large battery pack 30, the top plate 21 of the battery mount portion 20 may contact the inclined surface 39s of the hook 39 of the large battery pack 30 and may then be slid relative thereto, so that the hook 39 may be pressed downward against the biasing force of the spring 39b. When the battery mount portion 20 of the large electric tool 10 has been slid forward relative to the large battery pack 30 to reach a connection completion position, the rectangular projection 21t of the top plate 21 of the battery mount portion 20 may be positioned to be opposed to the hook 39, so that the hook 39 may protrude upward through the slit-like opening 38 by the biasing force of the spring 39b. Then, the slide lock portion 39k (more specifically, its front surface) may engage the hook receiving stepped portion 21d of the battery mount portion 20, so that the large electric tool 10 may be prevented from being slid further in the removing direction (rearward sliding movement).

In addition, when the battery mount portion 20 of the large electric tool 10 has been slid forward relative to the large battery pack 30 to reach the connection completion position, power source terminals and signal terminals (not shown) of the large electric tool 10 may be respectively electrically connected to power source terminals and signal terminals (not shown) of the large battery pack 30.

In this way, the battery mount portion 20 of the large electric tool 10 and the large battery pack 30 may be connected to each other by way of fitting between the left and right rear-side slide rails 35 and the left and right rear-side rectangular groves 24x and also by way of fitting between the left and right front-side slide rails 37 and the left and right front-side rectangular grooves 26m. As a result, the weight of the large battery pack 30 that may be relatively large due to its large capacity may be supported in stable at two positions or at the rear-side slide rails 35 and the front-side slide rails 37.

<Connection between Large Battery Pack and Small Electric Tool>

Figure 6:
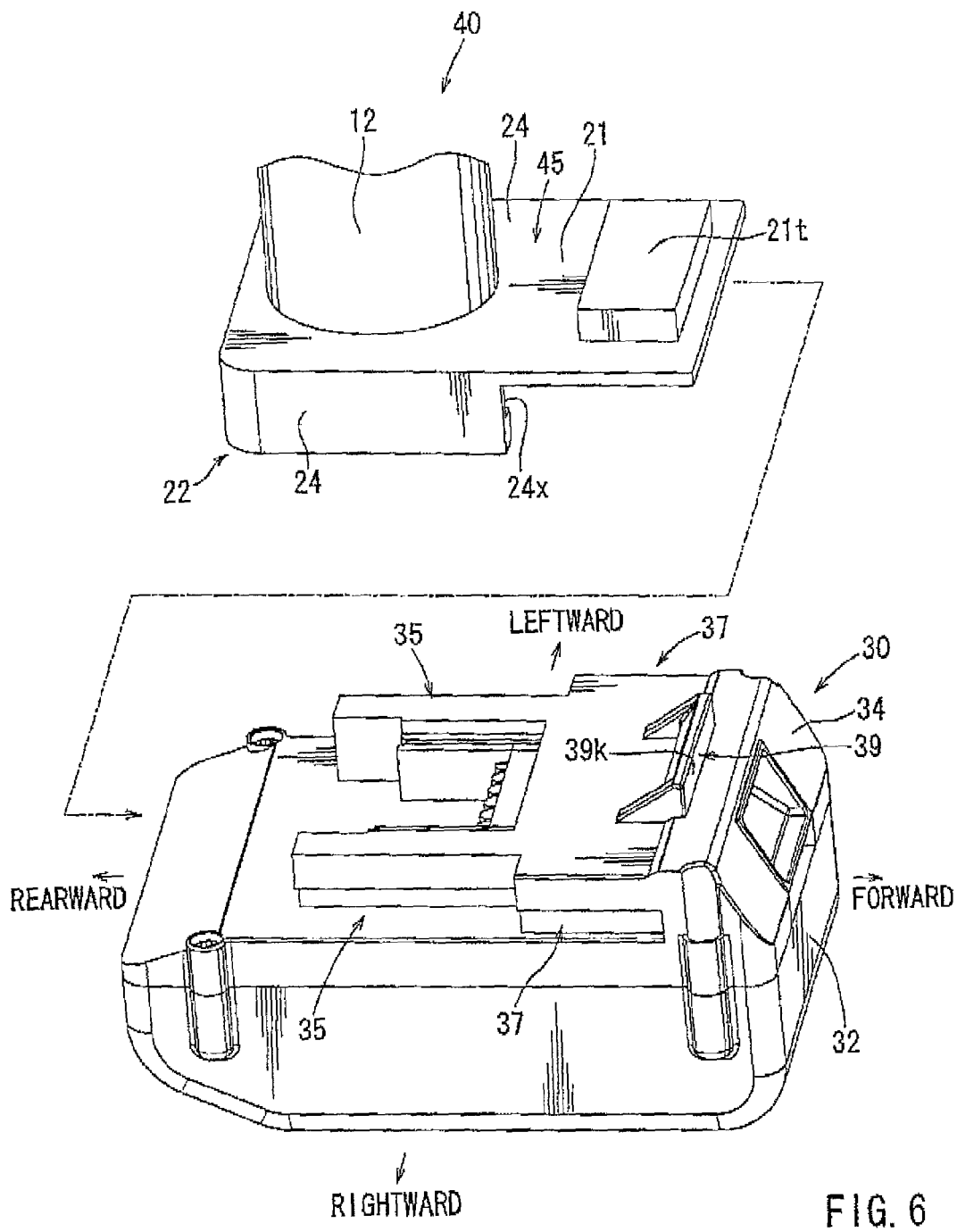
FIG. 6 is a perspective view showing the large battery pack and a battery mount portion of a small electric tool, to which the large battery pack is connected.

The large battery pack 30 may be connectable with a small electric tool 40 as shown in FIG. 6.

A battery mount portion 45 of the small electric tool 40 may be different from the battery mount portion 20 of the large electric tool 10 in that the width of the battery mount portion 45 is smaller than that of the battery mount portion 20. In addition, the battery mount portion 45 may be different from the battery mount portion 20 in that the battery mount portion 45 does not have the left and right front-side lateral wall portions 26 nor the stepped portions 25. In other respect, the battery mount portion 45 may be configured to be the same as the battery mount portion 20. Therefore, in FIGS. 6 and 7, like members are given the same reference numerals as the battery mount portion 20 and the description of these members will not be repeated.

Figure 7:
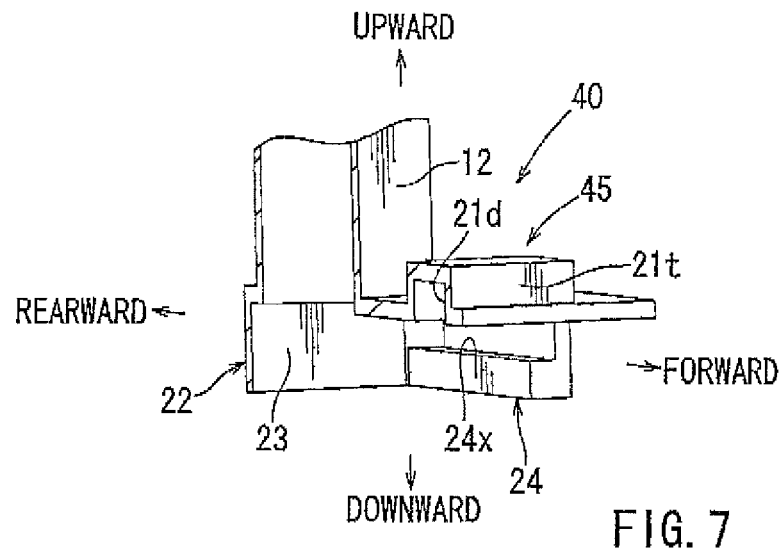
FIG. 7 is a perspective view showing in cross section a central portion of the battery mount portion of the small electric tool.

Thus, as shown in FIGS. 6 and 7, the battery mount portion 45 may have a vertical wall 22 having a substantially U-shape with its front side opened as seen in a plan view. The vertical wall 22 may include a rear end wall portion 23 and left and right rear-side lateral wall portions 24. The distance between the left and right rear-side lateral wall portions 24 of the battery mount portion 45 may be set to be equal to the distance between the left and right rear-side lateral wall portions 24 of the battery mount portion 20.

Figure 8:
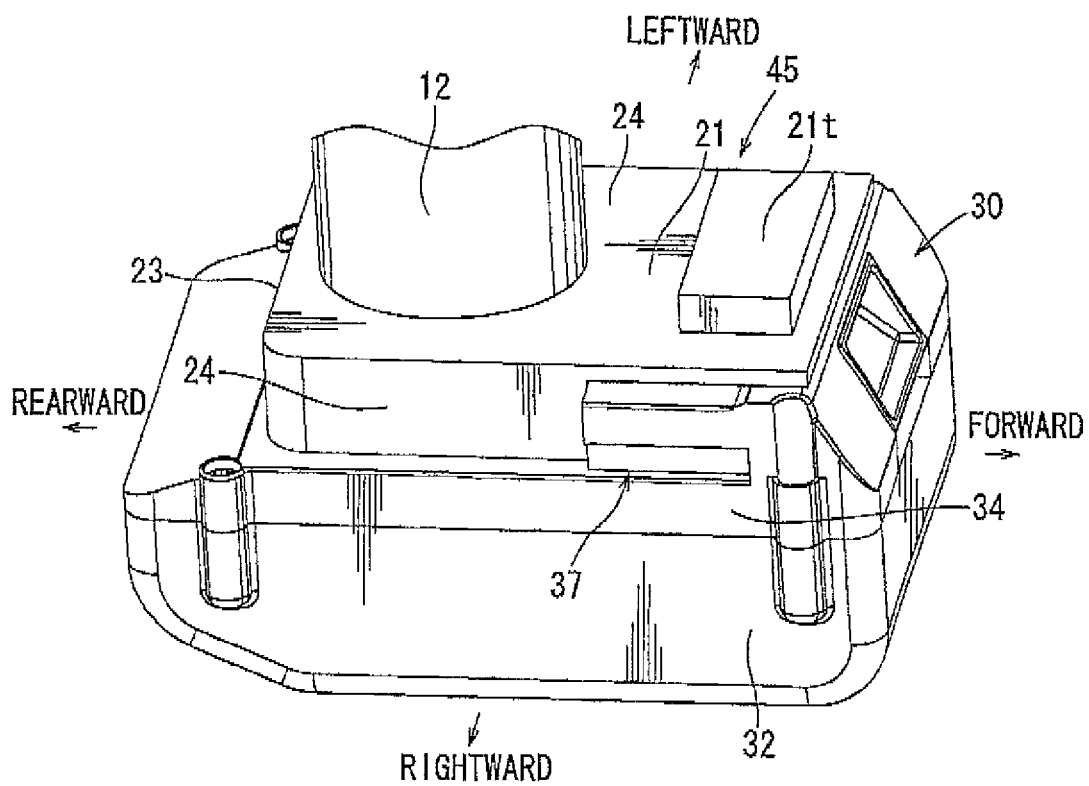
FIG. 8 is a perspective view showing the state where the large battery pack and the battery mount portion of the small electric tool have been connected to each other.

In order to connect the large battery pack 30 and the small electric tool 40, the small electric tool 40 may be moved horizontally forward from the rear side of the large battery pack 30, so that the front ends of the left and right rear-side rectangular grooves 24x of the battery mount portion 45 of the small electric tool 40 are brought to be fitted with the left and right rear-side slide rails 35 of the large battery pack 30. Then, the left and right rear-side slide rails 35 and the left and right rear-side rectangular grooves 24x may slide relative to each other in the forward and rearward directions while they are fitted with each other. In the course of the forward sliding movement of the battery mount portion 45, the hook 39 may be pressed downward against the biasing force of the spring 39b as described previously. When the battery mount portion 45 has reached a connection completion position, the hook 39 may protrude upward through the slit-like opening 38 by the biasing force of the spring 39b. Then, the slide lock portion 39k may engage the hook receiving stepped portion 21d of the battery mount portion 45, so that the battery mount portion 45 of the small electric tool 40 may be connected to the large battery pack 30 as shown in FIG. 8.

<Small Battery Pack>

Figure 9:
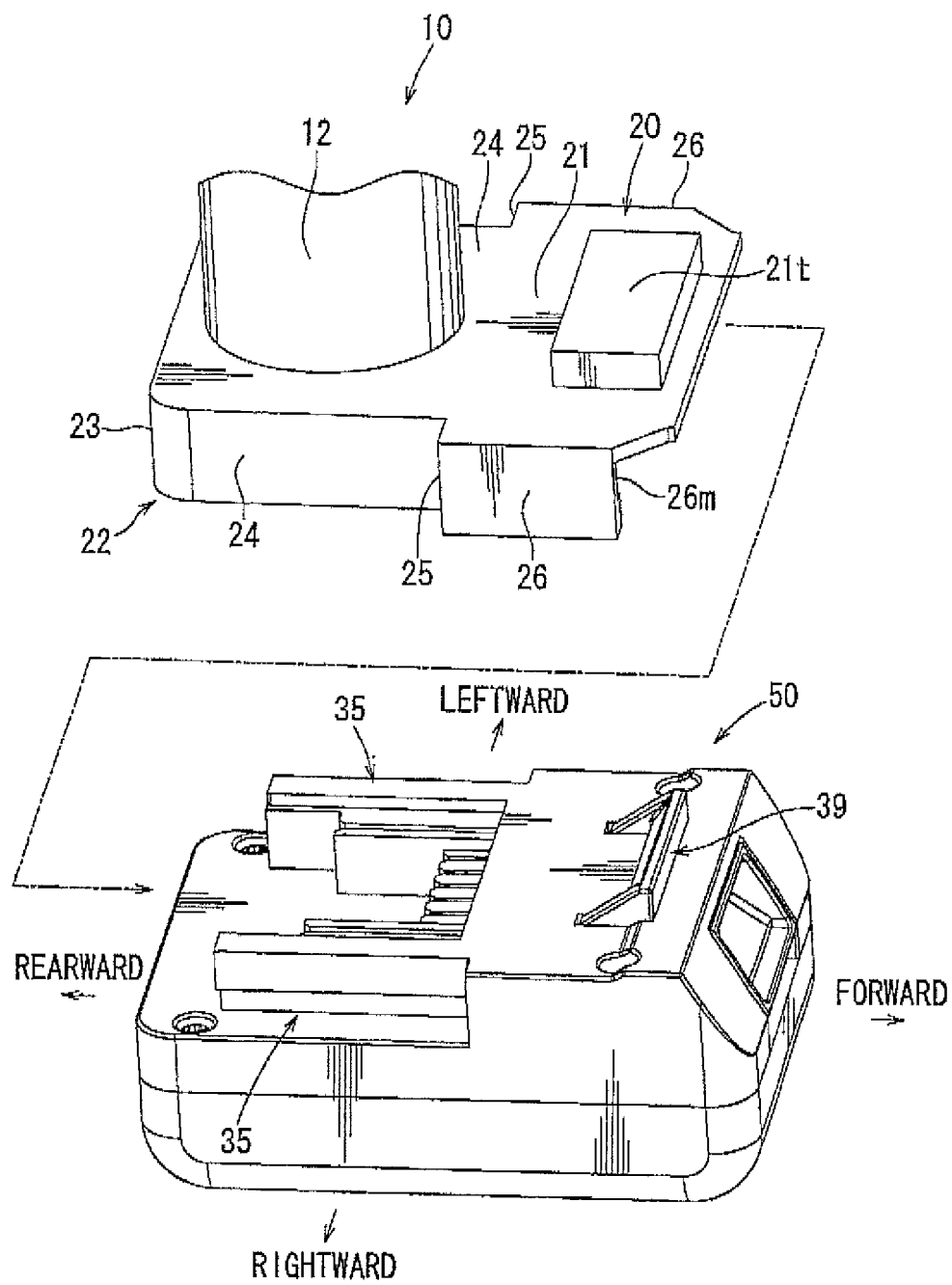
FIG. 9 is a perspective view showing a small battery pack and the battery mount portion of the large electric tool, to which the small battery pack is connected.

A small battery pack 50 shown in FIG. 9 may be typically used as a power source for the small power tool 40. In FIG. 9, like members are given the same reference numerals as the large battery pack 30 and the description of these members will not be repeated. The small battery pack 50 is different from the large battery pack 30 in that the housing size is smaller than that of the large battery pack 30 and that it only has left and right slide rails 35 that may be the same in the specification (standard) as the left and right rear-side slide rails 35 of the large battery pack 30. In other respect, the small battery pack 50 may be configured to be the same as the large battery pack 30.

<Connection of Small Battery Pack to Small Electric Tool and to Large Electric Tool>

In order to connect the small electric tool 40 to the small battery pack 50, the left and right rear-side rectangular grooves 24x of the battery mount portion 45 of the small electric tool 40 are brought to be fitted with the left and right slide rails 35 of the small battery pack 50. Then, the left and right slide rails 35 and the left and right rear-side rectangular grooves 24x may be slid relative to each other in the forward and rearward directions. When the battery mount portion 45 has reached a connection completion position, the slide lock portion 39k of the hook 39 may engage the hook receiving stepped portion 21d by the biasing force of the spring 39b, so that the small electric tool 40 may be connected to the small battery pack 50.

Here, the distance between the left and right rear-side lateral wall portions 24 of the battery mount portion 45 of the small electric tool 10 may be determined to be equal to the distance between the left and right rear-side lateral wall portions 24 of the battery mount portion 20 of the large electric tool 10. Therefore, the small battery pack 50 can be connected to the battery mount portion 20 of the large electric tool 10 by fitting the left and right slide rails 35 of the small battery pack 50 into the left and right rear-side rectangular grooves 24x of the small battery pack 50 and thereafter moving the slide rails 35 to slide relative to the rectangular grooves 24x.

As described above, both of the left and right slide rails 35 of the small battery pack 50 and the left and right rear-side slide rails 35 of the large battery pack 30 can be connected to both of the battery mount portion 20 of the large electric tool 10 and the battery mount portion 45 of the small electric tool 40.

In this way, the left and right slide rails 35 of the small battery pack 50 and the left and right rear-side slide rails 35 of the large battery pack 30 respectively serve as main connection sections, while the left and right front-side slide rails 37 of the large battery pack 30 serves as an auxiliary connection section. The left and right rear-side slide rectangular grooves 24x of each of the large electric tool 10 and the small electric tool 40 may serve as a main connection complimentary section, while the left and right front-side rectangular grooves 26m of the large electric tool 10 may serve as an auxiliary connection complimentary section.

<Advantages of Large Battery Pack>

The large battery pack 30 according to the above embodiment includes the left and right rear-side slide rails 35 (main connection section) and the left and right front-side slide rails 37 (auxiliary connection section). In addition, the left and right rear-side slide rails 35 (main connection section) and the left and right front-side slide rails 37 (auxiliary connection section) can be respectively connected to the left and right rear-side rectangular grooves 24x (main connection complimentary section) and the left and right front-side rectangular grooves 26m (auxiliary connection complimentary section) of the battery mount portion 20 of the large power tool 10 (i.e., a specific kind of electric apparatus). Further, the weight of the large battery pack 30 can be supported at the left and right rear-side slide rails 35 (main connection section) and the left and right front-side slide rails 37 (auxiliary connection section).

Therefore, even in the case that the left and right rear-side slide rails 35 (main connection section) used for connection with the large electric tool 10 and the small electric tool 40 (more specifically, their battery mount portions) are configured to be small in size, it may be still possible to support a large weight due to the presence of the left and right front-side slide rails 37 (auxiliary connection section).

In this way, by minimizing the size of the left and right rear-side slide rails 35 (main connection section) used for connection with the large electric tool 10 and the small electric tool 40 (more specifically, their battery mount portions), it is possible to minimize the size of the small battery pack 50 that has only the left and right slide rails 35 (main connection section).

Further, in the large battery pack 30, the left and right rear-side slide rails 35 (main connection section) are spaced apart from the left and right front-side slide rails 37 (auxiliary connection section). With this arrangement, the weight of the large battery pack 30 can be efficiently supported at the left and right rear-side slide rails 35 (main connection section) and the left and right front-side slide rails 37 (auxiliary connection section).

Figure 10:
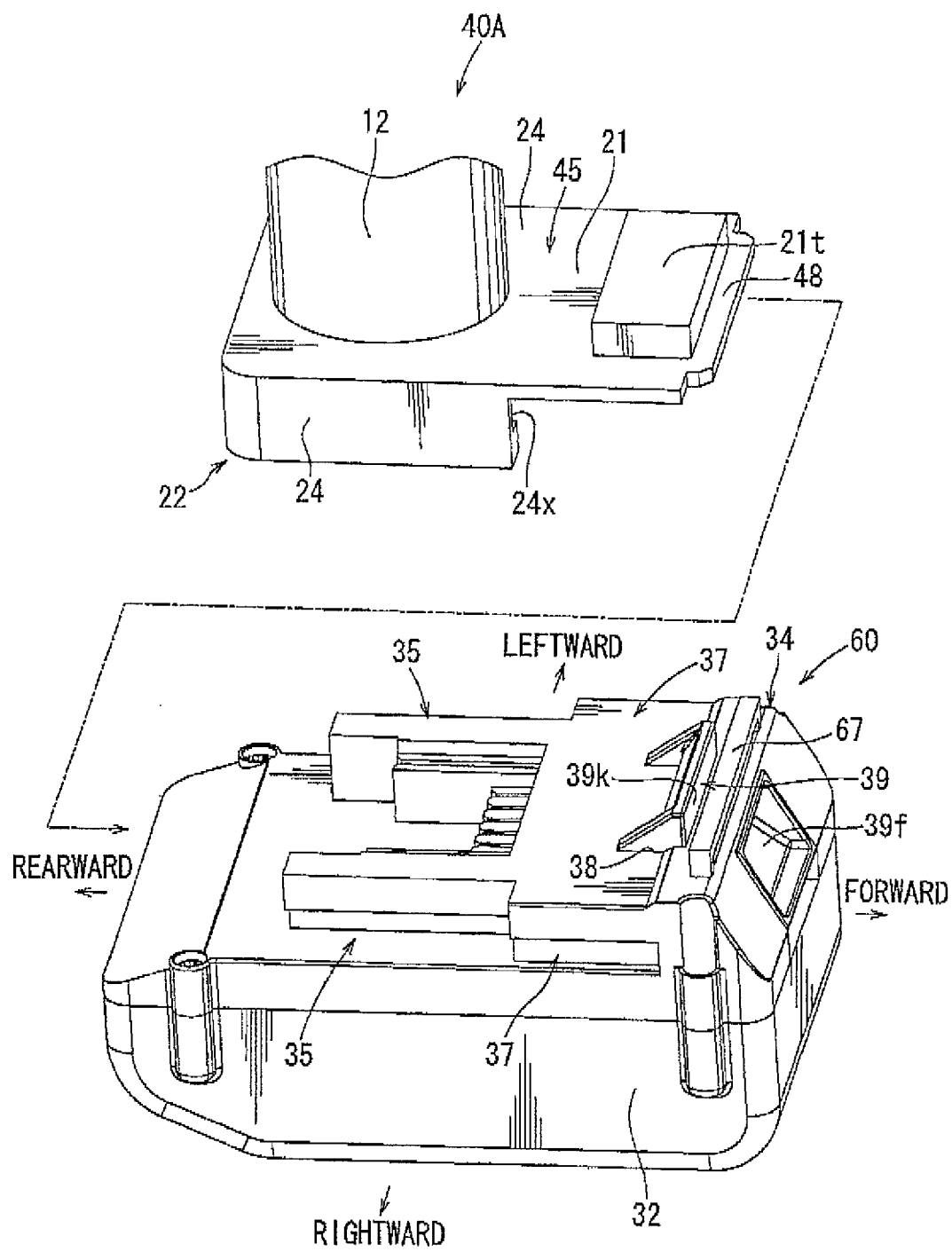
FIG. 10 is a perspective view showing a large battery pack and a battery mount portion of a small electric tool, to which the large battery pack is connected, according to a second embodiment.
Figure 11:
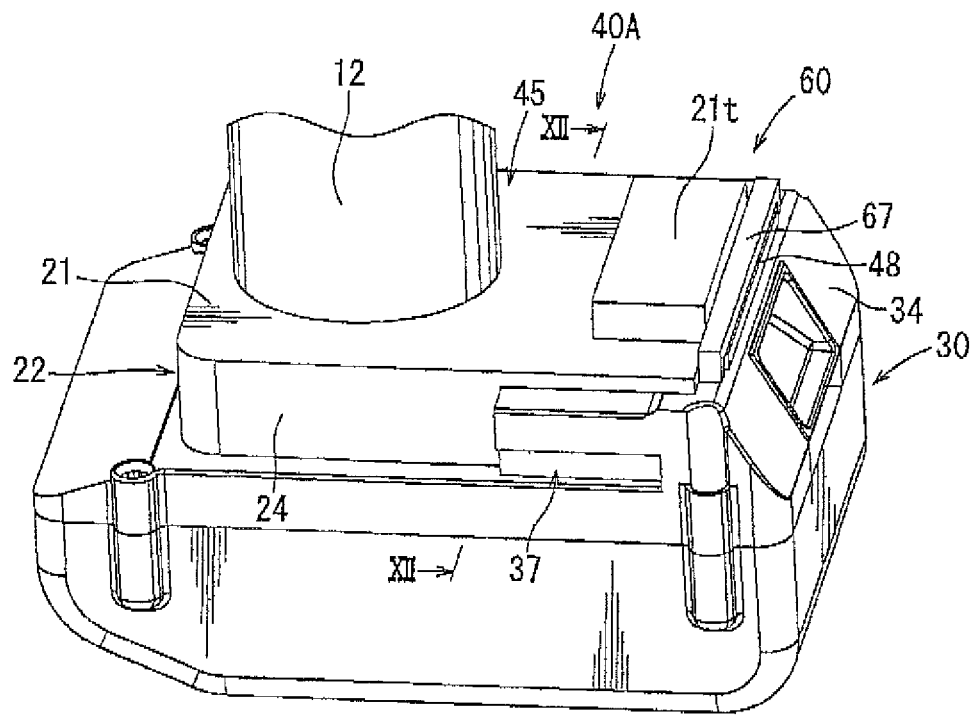
FIG. 11 is a perspective view showing the state where the lame battery pack and the battery mount portion of the small electric tool have been connected to each other.

An embodiment will now be described with reference to FIGS. 10 to 12. A gate-shaped engaging portion 67 is provided on the front side of the hook 39 (more specifically, the slit-shaped opening 38) of the battery pack 60 in this embodiment. In other respects, the battery pack 60 may be the same as the large battery pack 30 previously described. Therefore, in the battery pack 60 shown in FIGS. 10 to 12, like members are given the same reference numerals as the battery pack 30, and the description of these members will not be repeated.

Further, according to this embodiment, a small power tool 40A, to which the battery pack 60 is connected, has a projection 48 formed at the front end of the top plate 21. The projection 48 may be fitted into the gate-shaped engaging portion 67 of the battery pack 60 in the sliding direction. In other respects, the construction of the small power tool 40A may be the same as the small power tool 40 previously described. Therefore, in the small power tool 40A shown in FIGS. 10 to 12, like members are given the same reference numerals as the small power tool 40, and the description of these members will not be repeated.

Figure 12:
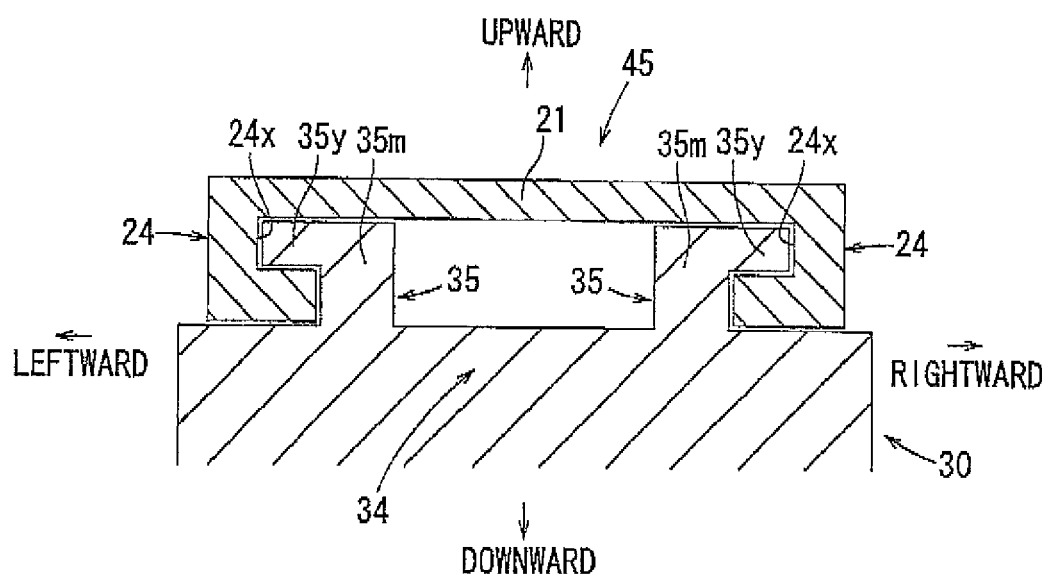
FIG. 12 is a sectional view taken along line XII-XII in FIG. 11.
Figure 13:
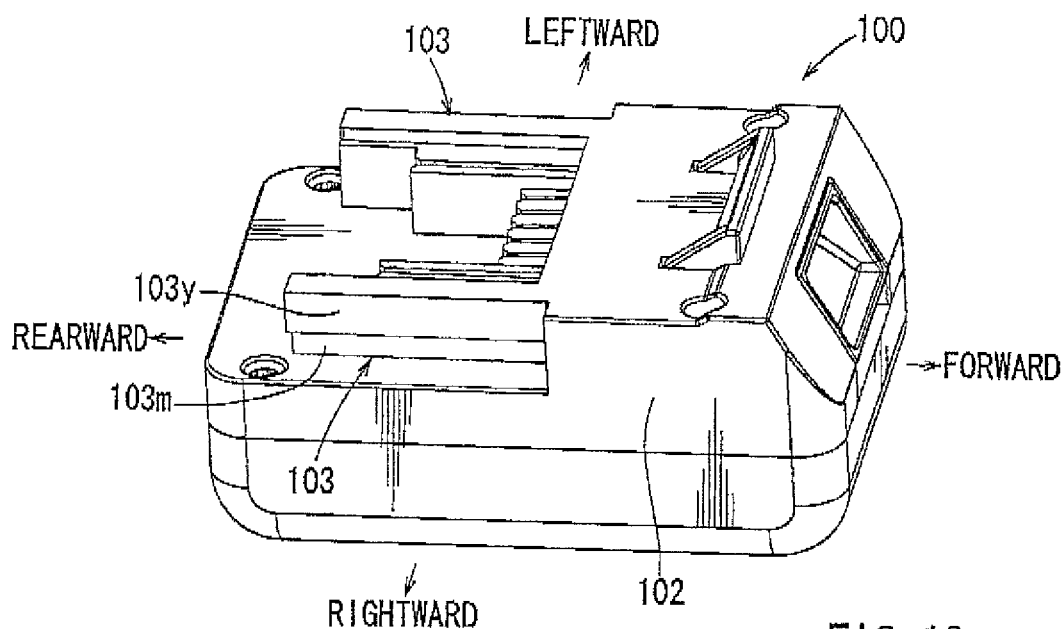
FIG. 13 is a perspective view of a known battery pack.
Figure 14:
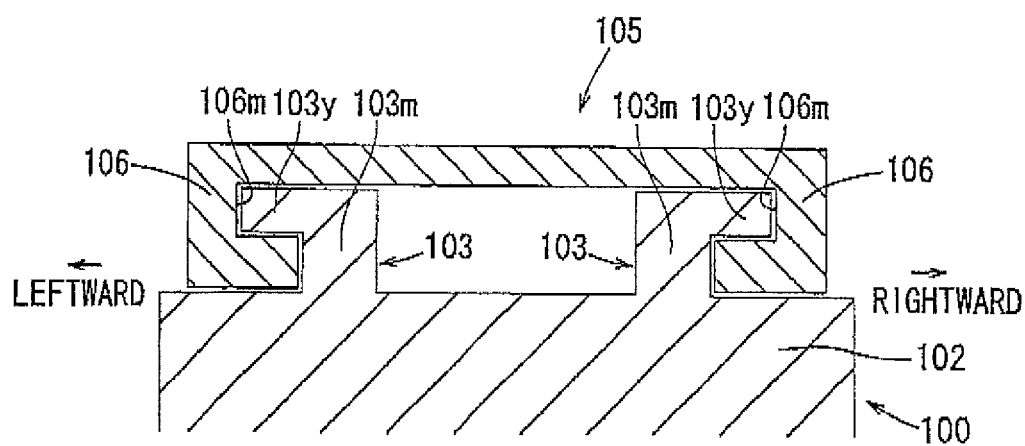
FIG. 14 is a sectional view showing the state where the known battery pack and a battery mount portion of an electric tool have been connected to each other.

Therefore, the left and right rear-side rectangular grooves 24x of the battery mount portion 45 of the small electric tool 40A may be brought to be fitted with the left and right rear-side slide rails 35 of the battery pack 60 and may be slid relative to the left and right rear-side slide rails 35 as shown in FIG. 12. When the battery mount portion 45 has reached a connection completion position, the projection 48 of the small electric tool 40A may be fitted into the gate-shaped engaging portion 67 of the battery pack 60.

In this way, the weight of the battery pack 60 can be supported at the left and right rear-side slide rails 35 and also at the gate-shaped engaging portion 67. In other words, the weight of the battery pack 60 can be supported at the gate-shaped engaging portion 67 in place of the left and right front-side slide rails 37.

Thus, the gate-shaped engaging portion 67 may serve as an auxiliary connection section, while the projection 48 of the battery mount portion 45 of the small electric tool 40A may serve as an auxiliary connection complimentary section.

<Possible Modifications>

The above first and second embodiments may be modified in various ways. For example, although the large electric tool 10 and the small electric tools 40 and 40A have been exemplified in the above embodiments, the present teachings can also be applied to any other electric apparatus, such as a grass cutter and a clipper.

Further, although the gate-shaped engaging portion 67 has been exemplified as an example of the auxiliary connection section of the battery pack 60, the gate-shaped engaging portion 67 may be replaced with one or some of the terminals of the battery pack 60 formed to have a hook shape for hooking to a part of the top plate 21 of the small electric tool 40A.

What is claimed is:

1. A battery pack configured to be connectable with battery mount portions of a plurality of electric apparatuses, the battery pack comprising:
    a main connection section configured to be connectable with main connection complimentary sections of the battery mount portions of the plurality of electric apparatuses as the main connection section is slid relative thereto in a direction; and
    an auxiliary connection section configured to be connectable with an auxiliary connection complimentary section provided on the battery mount portion of a specific kind of electric apparatus of the plurality of electric apparatuses, wherein:
    the main connection section and the auxiliary connection section are configured such that the weight of the battery pack can be supported at the main connection section and the auxiliary connection section when the battery pack is connected to the battery mount portion of the specific kind of electric apparatus; and
    the main connection section and the auxiliary connection section each comprise a pair of guide rails.

2. The battery pack according to claim 1, wherein:
    the main connection section and the auxiliary connection section are disposed at positions spaced apart from each other.

3. The battery pack according to claim 1, wherein:
    the auxiliary connection section is configured to be connectable with the auxiliary connection complimentary section as the auxiliary connection section is slid relative to the auxiliary connection complimentary section.

4. The battery pack according to claim 3, wherein:
    the main connection section is connectable with the main connection complimentary section of the battery mount portion of the specific kind of electric apparatus as the main connection section is slid relative to the main connection complimentary section in a first sliding direction; and
    the auxiliary connection section is connectable with the auxiliary connection complimentary section of the battery mount portion of the specific kind of electric apparatus as the auxiliary connection section is slid relative to the auxiliary connection complimentary section in a second sliding direction; and
    the first direction is the same as the second direction.

5. The battery pack according to claim 1, wherein
    the auxiliary connection complimentary section comprises a projection; and
    the auxiliary connection section comprises an engaging portion configured to be engageable with the projection.

6. The battery pack according to claim 5, wherein:
    the engaging portion is disposed at a position determined such that the engaging portion engages the projection after the main connection section is slid in a direction relative to the main connection complimentary section of the battery mount portion of the specific kind of electric apparatus.

7. The battery pack according to claim 1, wherein:
    the main connection section and the auxiliary connection section are respectively connectable with the main connection complimentary section and the auxiliary connection complimentary section of the battery mount portion of the specific kind of electric apparatus; and
    the main connection section is connectable with the main connection complimentary section of the battery mount portion of a non-specific kind of electric apparatus of the plurality of electric apparatuses.

8. The battery pack according to claim 1, wherein:
    the guide rails each comprise a rail body and a lateral linear projection protruding outward in a widthwise direction of the rail body.

9. The battery pack according to claim 1, wherein:
    the main connection section is formed on a rear portion of the battery pack and the auxiliary connection section is formed on a front portion of the battery pack with respect to a forward and rearward direction of the battery pack, wherein the main and auxiliary connection sections extend in the same forward and rearward direction of the battery pack.

10. The battery pack according to claim 1, wherein:
    the auxiliary connection section is positioned outward with respect to a widthwise direction of the main connection section.

11. The battery pack according to claim 1, wherein:
    a length of the main connection section is longer than a length of the auxiliary connection section.

12. A system comprising:
    a plurality of electric apparatuses each having a battery mount portion; and
    a plurality of battery packs configured to be connectable with the battery mount portions of the plurality of electric apparatuses; wherein:
    the plurality of electric apparatuses include a specific kind of electric apparatus and a non-specific kind of electric apparatus;
    the plurality of battery packs include a specific kind of battery pack having a main connection section and an auxiliary connection section, and a non-specific kind of battery pack having a main connection section and no auxiliary connection section;
    the battery mount portion of the specific kind of electric apparatus includes a main connection complimentary section and an auxiliary connection complimentary section, the main connection complimentary section being configured to be connectable with the plurality of battery packs as the plurality of battery packs are slid in a sliding direction relative to the main connection complimentary section, and the auxiliary connection complimentary section being connectable with the auxiliary connection section of the specific kind of battery pack;
    the battery mount portion of the non-specific kind of electric apparatus includes a main connection complimentary section and no auxiliary connection complimentary section, the main connection complimentary section being configured to be connectable with the plurality of battery packs as the plurality of battery packs are slid in a sliding direction relative to the main connection complimentary section; and
    the main connection section and the auxiliary connection section of the specific kind of battery pack are configured such that the weight of the specific kind of battery pack can be supported at the main connection section and the auxiliary connection section when the specific kind of battery pack is connected to the battery mount portion of the specific kind of electric apparatus.

13. A system comprising:
a specific kind of electric apparatus having a battery mount portion; and
a plurality of battery packs configured to be connectable with the battery mount portion; wherein:
the plurality of battery packs include a specific kind of battery pack having a main connection section and an auxiliary connection section, and a non-specific kind of battery pack having a main connection section and no auxiliary connection section;
the battery mount portion of the specific kind of electric apparatus includes a main connection complimentary section and an auxiliary connection complimentary section, the main connection complimentary section being configured to be connectable with the plurality of battery packs as the plurality of battery packs are slid in a sliding direction relative to the main connection complimentary section, and the auxiliary connection complimentary section being connectable with the auxiliary connection section of the specific kind of battery pack;
the main connection section and the auxiliary connection section of the specific kind of battery pack are configured such that the weight of the specific kind of battery pack can be supported at the main connection section and the auxiliary connection section when the specific kind of battery pack is connected to the battery mount portion of the specific kind of electric apparatus; and
the main connection section of the non-specific kind of battery pack is configured such that the weight of the non-specific kind of battery pack can be supported only at the main connection section when the non-specific kind of battery pack is connected to the battery mount portion of the specific kind of electric apparatus.

* * * * *